United States Patent
Humphrey et al.

(10) Patent No.: US 12,069,073 B2
(45) Date of Patent: Aug. 20, 2024

(54) CYBER THREAT DEFENSE SYSTEM AND METHOD

(71) Applicant: Darktrace Holdings Limited, Cambridge (GB)

(72) Inventors: Dickon Murray Humphrey, Cambridge (GB); Timothy Owen Bazalgette, Knebworth (GB); Andres Curto Martin, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 634 days.

(21) Appl. No.: 17/187,383

(22) Filed: Feb. 26, 2021

(65) Prior Publication Data

US 2021/0273960 A1    Sep. 2, 2021

Related U.S. Application Data

(60) Provisional application No. 62/983,307, filed on Feb. 28, 2020.

(51) Int. Cl.
| | |
|---|---|
| *H04L 9/40* | (2022.01) |
| *G06N 3/049* | (2023.01) |
| *G06N 7/01* | (2023.01) |
| *G06N 20/00* | (2019.01) |

(52) U.S. Cl.
CPC ......... *H04L 63/1425* (2013.01); *G06N 3/049* (2013.01); *G06N 7/01* (2023.01); *G06N 20/00* (2019.01); *H04L 63/1416* (2013.01); *H04L 63/1433* (2013.01)

(58) Field of Classification Search
USPC ................................................... 726/22–25
See application file for complete search history.

(56) References Cited

U.S. PATENT DOCUMENTS

| | | | |
|---|---|---|---|
| 6,154,844 | A | 11/2000 | Touboul et al. |
| 6,965,968 | B1 | 11/2005 | Touboul |
| 7,307,999 | B1 | 12/2007 | Donaghey |

(Continued)

FOREIGN PATENT DOCUMENTS

| | | |
|---|---|---|
| EP | 2922268 A1 | 9/2015 |
| WO | 2001031420 A2 | 5/2001 |

(Continued)

OTHER PUBLICATIONS

Gharan, Shayan Oveis, "Lecture 11; Clustering and the Spectral Partitioning Algorithm" May 2, 2016, 6 pages.

(Continued)

*Primary Examiner* — Kambiz Zand
*Assistant Examiner* — Mahabub S Ahmed
(74) *Attorney, Agent, or Firm* — Rutan and Tucker, LLP

(57) ABSTRACT

Cyber threat defense systems and methods are provided. The system includes a network module, an analyzer module and a classifier. The network module ingests network data, which is provided to one or more machine learning models included in the analyzer module. Each machine learning model identifies metrics associated with the network data and outputs a score indicative of whether anomalous network data metrics are caused by a cyber threat. These output scores are provided to the classifier, which determines a probability that a cybersecurity breach has occurred.

19 Claims, 6 Drawing Sheets

(56) References Cited

U.S. PATENT DOCUMENTS

| | | | |
|---|---|---|---|
| 7,418,731 B2 | 8/2008 | Touboul | |
| 7,448,084 B1* | 11/2008 | Apap | G06F 21/552 726/22 |
| 7,890,869 B1 | 2/2011 | Mayer et al. | |
| 8,312,540 B1 | 11/2012 | Kahn et al. | |
| 8,661,538 B2 | 2/2014 | Cohen-Ganor et al. | |
| 8,819,803 B1 | 8/2014 | Richards et al. | |
| 8,879,803 B2 | 11/2014 | Ukil et al. | |
| 8,966,036 B1 | 2/2015 | Asgekar et al. | |
| 9,043,905 B1 | 5/2015 | Allen et al. | |
| 9,106,687 B1 | 8/2015 | Sawhney et al. | |
| 9,185,095 B1 | 11/2015 | Moritz et al. | |
| 9,213,990 B2 | 12/2015 | Adjaoute | |
| 9,280,661 B2* | 3/2016 | Adjaoute | G06N 5/048 |
| 9,348,742 B1 | 5/2016 | Brezinski | |
| 9,401,925 B1 | 7/2016 | Guo et al. | |
| 9,516,039 B1 | 12/2016 | Yen et al. | |
| 9,516,053 B1 | 12/2016 | Muddu et al. | |
| 9,628,507 B2* | 4/2017 | Haq | G06F 21/564 |
| 9,641,544 B1 | 5/2017 | Treat et al. | |
| 9,712,548 B2 | 7/2017 | Shmuell et al. | |
| 9,727,723 B1 | 8/2017 | Kondaveeti et al. | |
| 10,237,298 B1 | 3/2019 | Nguyen et al. | |
| 10,268,821 B2 | 4/2019 | Stockdale et al. | |
| 10,397,255 B1* | 8/2019 | Bhalotra | H04L 63/1425 |
| 10,419,466 B2 | 9/2019 | Ferguson et al. | |
| 10,423,788 B2* | 9/2019 | Keromytis | G06F 21/577 |
| 10,516,693 B2 | 12/2019 | Stockdale et al. | |
| 10,701,093 B2 | 6/2020 | Dean et al. | |
| 10,715,543 B2* | 7/2020 | Jakobsson | H04L 63/1433 |
| 10,740,164 B1* | 8/2020 | Roy | G06F 9/547 |
| 10,771,489 B1* | 9/2020 | Bisht | G06N 20/00 |
| 11,057,409 B1* | 7/2021 | Bisht | H04L 43/04 |
| 11,102,244 B1* | 8/2021 | Jakobsson | H04L 51/42 |
| 11,165,800 B2* | 11/2021 | Thampy | H04L 63/20 |
| 11,297,083 B1* | 4/2022 | Kuppa | H04L 63/1458 |
| 11,354,671 B2* | 6/2022 | Goshen | G06Q 20/4016 |
| 11,423,143 B1* | 8/2022 | Lin | G06F 21/552 |
| 11,457,031 B1* | 9/2022 | Bisht | G06N 7/01 |
| 11,722,513 B2* | 8/2023 | Jakobsson | H04L 63/0227 |
| 2002/0010679 A1* | 1/2002 | Felsher | G06F 21/6245 705/51 |
| 2002/0174217 A1 | 11/2002 | Anderson et al. | |
| 2002/0186698 A1 | 12/2002 | Ceniza | |
| 2003/0070003 A1 | 4/2003 | Chong et al. | |
| 2003/0093514 A1* | 5/2003 | Valdes | H04L 63/1416 709/224 |
| 2004/0083129 A1 | 4/2004 | Herz | |
| 2004/0167893 A1 | 8/2004 | Matsunaga et al. | |
| 2005/0060295 A1* | 3/2005 | Gould | H04L 63/1425 |
| 2005/0065754 A1 | 3/2005 | Schaf et al. | |
| 2006/0191010 A1* | 8/2006 | Benjamin | G06F 21/552 726/23 |
| 2007/0118909 A1 | 5/2007 | Hertzog et al. | |
| 2007/0294187 A1 | 12/2007 | Scherrer | |
| 2008/0005137 A1 | 1/2008 | Surendran et al. | |
| 2008/0077358 A1 | 3/2008 | Marvasti | |
| 2008/0109730 A1 | 5/2008 | Coffman et al. | |
| 2009/0106174 A1 | 4/2009 | Battisha et al. | |
| 2009/0254971 A1 | 10/2009 | Herz et al. | |
| 2010/0009357 A1 | 1/2010 | Nevins et al. | |
| 2010/0082513 A1* | 4/2010 | Liu | H04L 63/1458 706/46 |
| 2010/0095374 A1 | 4/2010 | Gillum et al. | |
| 2010/0107254 A1 | 4/2010 | Elland et al. | |
| 2010/0125908 A1 | 5/2010 | Kudo | |
| 2010/0235908 A1 | 9/2010 | Eynon et al. | |
| 2010/0299292 A1 | 11/2010 | Collazo | |
| 2011/0083181 A1* | 4/2011 | Nazarov | H04L 63/14 726/23 |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 | 4/2012 | Amini et al. | |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1* | 11/2012 | Miller | G06F 21/554 726/22 |
| 2012/0304288 A1 | 11/2012 | Wright et al. | |
| 2013/0091539 A1 | 4/2013 | Khurana et al. | |
| 2013/0198119 A1* | 8/2013 | Eberhardt, III | G06N 20/00 706/12 |
| 2013/0198840 A1 | 8/2013 | Drissi et al. | |
| 2013/0254885 A1 | 9/2013 | Devost | |
| 2014/0007237 A1 | 1/2014 | Wright et al. | |
| 2014/0074762 A1 | 3/2014 | Campbell | |
| 2014/0165207 A1 | 6/2014 | Engel et al. | |
| 2014/0215618 A1 | 7/2014 | Amit | |
| 2014/0325643 A1 | 10/2014 | Bart et al. | |
| 2015/0067835 A1 | 3/2015 | Chari et al. | |
| 2015/0081431 A1 | 3/2015 | Akahoshi et al. | |
| 2015/0161394 A1 | 6/2015 | Ferragut et al. | |
| 2015/0163121 A1 | 6/2015 | Mahaffey et al. | |
| 2015/0172300 A1 | 6/2015 | Cochenour | |
| 2015/0180893 A1 | 6/2015 | Im et al. | |
| 2015/0213358 A1 | 7/2015 | Shelton et al. | |
| 2015/0286819 A1 | 10/2015 | Coden et al. | |
| 2015/0310195 A1 | 10/2015 | Bailor et al. | |
| 2015/0319185 A1 | 11/2015 | Kirti et al. | |
| 2015/0341379 A1* | 11/2015 | Lefebvre | H04L 43/0894 726/22 |
| 2015/0363699 A1 | 12/2015 | Nikovski | |
| 2015/0379110 A1 | 12/2015 | Marvasti et al. | |
| 2016/0062950 A1 | 3/2016 | Brodersen et al. | |
| 2016/0078365 A1 | 3/2016 | Baumard | |
| 2016/0149941 A1 | 5/2016 | Thakur et al. | |
| 2016/0164902 A1 | 6/2016 | Moore | |
| 2016/0173509 A1 | 6/2016 | Ray et al. | |
| 2016/0241576 A1 | 8/2016 | Rathod et al. | |
| 2016/0352768 A1 | 12/2016 | Lefebvre et al. | |
| 2016/0359695 A1 | 12/2016 | Yadav et al. | |
| 2016/0373476 A1 | 12/2016 | Dell'Anno et al. | |
| 2017/0054745 A1 | 2/2017 | Zhang et al. | |
| 2017/0063907 A1 | 3/2017 | Muddu et al. | |
| 2017/0063910 A1 | 3/2017 | Muddu et al. | |
| 2017/0063911 A1 | 3/2017 | Muddu et al. | |
| 2017/0169360 A1* | 6/2017 | Veeramachaneni | G06F 21/56 |
| 2017/0270422 A1 | 9/2017 | Sorakado | |
| 2018/0004948 A1* | 1/2018 | Martin | H04L 63/1425 |
| 2018/0027006 A1* | 1/2018 | Zimmermann | H04L 63/0227 726/11 |
| 2018/0167402 A1 | 6/2018 | Scheidler et al. | |
| 2019/0036948 A1 | 1/2019 | Appel et al. | |
| 2019/0044963 A1 | 2/2019 | Rajasekharan et al. | |
| 2019/0098039 A1* | 3/2019 | Gates | G16H 20/70 |
| 2019/0132343 A1* | 5/2019 | Chen | G06N 3/045 |
| 2019/0251260 A1 | 8/2019 | Stockdale et al. | |
| 2020/0067861 A1* | 2/2020 | Leddy | G06F 21/6245 |
| 2020/0097587 A1* | 3/2020 | Klein | G06F 16/2462 |
| 2020/0133753 A1* | 4/2020 | Olson | G06F 11/0781 |
| 2020/0145433 A1* | 5/2020 | Gutierrez | H04L 63/1425 |
| 2020/0162491 A1* | 5/2020 | Correa Bahnsen | G06N 3/044 |
| 2020/0280575 A1 | 9/2020 | Dean et al. | |
| 2020/0285952 A1* | 9/2020 | Liu | G06N 3/08 |
| 2020/0296117 A1* | 9/2020 | Karpovsky | H04L 63/1416 |
| 2020/0396190 A1* | 12/2020 | Pickman | H04L 63/1483 |
| 2021/0021616 A1* | 1/2021 | Shabtai | H04L 63/145 |
| 2021/0084063 A1* | 3/2021 | Triantafillos | H04L 67/535 |
| 2021/0110343 A1* | 4/2021 | Lagneaux | H04L 9/321 |
| 2021/0120027 A1 | 4/2021 | Dean et al. | |
| 2021/0157919 A1 | 5/2021 | Stockdale et al. | |
| 2021/0211446 A1* | 7/2021 | Albero | H04W 12/121 |
| 2021/0258791 A1* | 8/2021 | Jochem Sanz | H04W 12/66 |
| 2021/0311929 A1* | 10/2021 | Swope | H04L 9/3239 |
| 2021/0319098 A1* | 10/2021 | Pogorelik | G06F 21/554 |
| 2021/0334656 A1* | 10/2021 | Sjögren | G06N 3/04 |
| 2022/0174089 A1* | 6/2022 | Piegert | G06V 10/82 |
| 2022/0210188 A1* | 6/2022 | Grewal | H04L 63/1483 |
| 2022/0263860 A1* | 8/2022 | Crabtree | H04L 63/1425 |

(56) References Cited

U.S. PATENT DOCUMENTS

| | | | | |
|---|---|---|---|---|
| 2022/0351024 | A1* | 11/2022 | Khayrallah | G06N 3/063 |
| 2023/0042552 | A1* | 2/2023 | Stockdale | H04L 41/069 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |
| WO | 2019243579 A1 | 12/2019 |
| WO | 2020021100 A1 | 1/2020 |

OTHER PUBLICATIONS

Nikolystylfw, "Can Senseon beat Darktrace at its very own game with its 'An I triangulation' modern technology?" Dec. 22, 2018, nikolystylfw.

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019" Jun. 3, 2019, 16 pages.

Caithness, Neil, "Supervised/unsupervised cross-over method for autonomous anomaly classification," Oct. 25, 2019, CAMLIS 2019.

Senseon Tech Ltd., "Technology," * please see the statement filed herewith.

Senseon Tech Ltd., "Senseon & You," * please see the statement filed herewith.

Senseon Tech Ltd., "Technology Overview," * please see the statement filed herewith.

Senseon Tech Ltd., "Senseon Enterprise," * please see the statement filed herewith.

Senseon Tech Ltd., "Senseon Pro," * please see the statement filed herewith.

Senseon Tech Ltd., "Senseon Reflex," * please see the statement filed herewith.

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts, " Lecture Notes in Computer Science, 2012, vol. 7465, Springer, Berlin, Heidelberg, Germany.

* cited by examiner

Ingest data from a plurality of sources (S1)

Derive metrics from the data (S2)

Analyse derived metrics using mathematical models (S3)

Compute a threat risk parameter indicative of a likelihood of there being a threat (S4)

Determine, based on the threat risk parameter, whether further action needs to be taken (S5)

FIGURE 6

CYBER THREAT DEFENSE SYSTEM AND METHOD

CROSS-REFERENCE TO RELATED APPLICATION(S)

This application claims priority to U.S. Provisional Application No. 62/983,307 filed 28 Feb. 2020, entitled AN ARTIFICIAL INTELLIGENCE BASED CYBERSECURITY SYSTEM, the disclosure of which is hereby expressly incorporated by reference herein in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system. In an embodiment, Artificial Intelligence is applied to analyzing Cybersecurity threats.

BACKGROUND

In the cybersecurity environment, firewalls, endpoint security methods and other tools such as SIEMs and sandboxes are deployed to enforce specific policies, and provide protection against certain threats. These tools currently form an important part of an organization's cyber defense strategy, but they are insufficient in the new age of cyber threat. Legacy tools are failing to deal with new cyber threats because the traditional approach relies on being able to pre-define the cyber threat in advance, by writing rules or producing signatures. In today's environment, this approach to defending against cyber threats is fundamentally flawed:

Threats are constantly evolving—novel attacks do not match historical-attack "signatures", and even subtle changes to previously understood attacks can result in them going undetected by legacy defenses;

Rules and policies defined by organizations are continually insufficient—security teams simply can't imagine every possible thing that may go wrong in future; and Employee 'insider' threat is a growing trend—it is difficult to spot malicious employees behaving inappropriately as they are a legitimate presence on the business network.

The reality is that modern threats bypass the traditional legacy defense tools on a daily basis. These legacy tools need a new tool based on a new approach that can complement them and mitigate their deficiencies at scale across the entirety of digital organizations. There is therefore a need for new tools and techniques that are able to identify characteristics of cybersecurity breaches to identify emergent cyber threats.

In the complex modern world it is advantageous that the approach is fully automated as it is virtually impossible for humans to sift through the vast amount of security information gathered each minute within a digital business.

SUMMARY

In an embodiment, various methods, apparatuses, and systems are discussed for a cybersecurity system.

These and other features of the design provided herein can be better understood with reference to the drawings, description, and claims, all of which form the disclosure of this patent application.

In a first aspect of the invention, a cyber threat defense system comprises a network module configured to ingest network data associated with network structures, network devices and network users, an analyzer module configured to cooperate with one or more machine learning models and the network module, wherein a first machine learning model is configured to evaluate the network data, identify metrics associated with the network data and then cooperate with the network module to output a score indicative of whether anomalous network data metrics are caused by a cyber threat, and an artificial intelligence classifier configured to receive outputs of each of the one or more machine learning models, determine a probability that a cybersecurity breach has occurred, and transmit a message to an autonomous response module based on the determined probability of a cybersecurity breach.

An embodiment of the invention further comprises a probability calculation module configured to calculate a probability distribution for the network data metrics, wherein the network data metrics are associated with a time and/or location of a network event and wherein a first of the one or more machine learning models is configured to determine a score based on a comparison between the probability distribution and the network data metrics.

In another embodiment of the invention the first machine learning model is configured to map the network data metrics and the probability distribution to a continuous shape and the artificial intelligence classifier is configured to identify anomalous network data metrics based on a comparison between the probability distribution and the network data metrics.

An embodiment of the invention further comprises a natural language processing module that analyses the network data metrics, wherein the network data metrics are associated with the file names and/or file extensions of computer files that have left the network, and wherein a second of the one or more machine learning models is configured to determine a score based on predetermined text strings identified in the file names and/or file extension and/or content of the computer file.

An embodiment of the invention further comprises a natural language processing module that analyses the network data metrics, wherein the network data metrics are associated with file extensions and/or mime types of computer files that have been altered, and wherein a third of the one or more machine learning models is configured to determine a score based on predetermined text strings identified in the file extensions and/or mime types.

An embodiment of the invention further comprises a natural language processing module that analyses the network data metrics, wherein the one or more network data metrics are associated with network communication protocols, and wherein a fourth of the one or more machine learning models is configured to determine a score based on predetermined text strings identified in the network communication protocols.

An embodiment of the invention further comprises an email module configured to ingest email data and a natural language processing module, wherein the analyzer module is further configured to receive the email data, wherein a fifth of the one or more machine learning models is configured to identify metrics associated with unencrypted email protocols and/or unencrypted email header information, wherein the fifth machine learning model is further configured to determine a score based on predetermined text strings identified in the unencrypted email protocols and/or unencrypted email header information, and wherein the fifth machine learning model is further configured to utilize one or more unsupervised machine learning algorithms.

An embodiment of the invention further comprises a data store configured to store historical network data, two or more machine learning models, and wherein each machine learning model is further configured to receive the historical network data.

In another embodiment of the invention, the analyzer module is further configured to form a hypothesis relating to whether a cybersecurity breach has occurred and provide outputs of the one or more machine learning models to the artificial intelligence classifier when the hypothesis is resolved to thereby continually train the artificial intelligence classifier during its operational life/deployment to identify cybersecurity breaches.

In another embodiment of the invention, the autonomous response module is configured to transmit a report identifying one or more identified network devices that have been compromised by a cybersecurity breach, and to cause an autonomous mitigation action directed to the one or more identified network devices that have been compromised by a cybersecurity breach when the score is above a threshold amount.

In a second aspect of the invention, an cyber threat defense method comprises ingesting network data associated with network structures, network devices and network users, evaluating the network data with a first of one or more machine learning models, identifying metrics associated with the network data, and outputting a score indicative of whether anomalous network data metrics are caused by a cyber threat, receiving output scores from each of the one or more machine learning models, determining a probability that a cybersecurity breach has occurred, and transmitting a message to an autonomous response module based on the determined probability of a cybersecurity breach.

An embodiment of the invention further comprises calculating a probability distribution for the network data metrics, wherein the network data metrics are associated with the time and/or location of a network event, and determining a score with a first machine learning model based on a comparison between the probability distribution and the network data metrics.

In an embodiment of the invention the first machine learning model maps the network data metrics and the probability distribution to a continuous shape and the artificial intelligence classifier compares the network data metrics with the probability distribution to identify anomalous network data metrics.

An embodiment of the invention further comprises analyzing the network data metrics, wherein the network data metrics are associated with the file names and/or file extensions of computer files that have left the network, and determining a score with a second machine learning model based on predetermined text strings identified in the file names and/or file extension and/or content of the computer file.

In another embodiment of the invention the network data metrics are associated with file extensions and/or mime types of computer files that have been altered, and further comprises determining a score with a third machine learning model based on predetermined text strings identified in the file extensions and/or mime types.

In another embodiment of the invention the one or more network data metrics are associated with network communication protocols, and further comprises determining a score with a fourth machine learning model based on predetermined text strings identified in the network communication protocols.

An embodiment of the invention further comprises ingesting email data, receiving the email data at a fifth machine learning model, identifying metrics associated with unencrypted email protocols and/or unencrypted email header information, and determining a score with the fifth machine learning model based on predetermined text strings identified in the unencrypted email protocols and/or unencrypted email header information.

An embodiment of the invention further comprises storing historical data and receiving the historical network data at each of two or more machine learning models.

An embodiment of the invention further comprises continually training a classifier to identify cybersecurity breaches by forming a hypothesis relating to whether a cybersecurity breach has occurred and providing the output scores from each machine learning model to train the artificial intelligence classifier when the hypothesis is resolved.

In a third aspect of the invention, a non-transitory computer-readable medium includes executable instructions that, when executed with one or more processors, cause a cyber-threat defense system to perform the method according to the second aspect of the invention.

DRAWINGS

The drawings refer to some embodiments of the design provided herein in which:

FIG. 6 shows an example flow diagram that illustrates an example process carried out by the cyber threat defense system.

Figure 1:
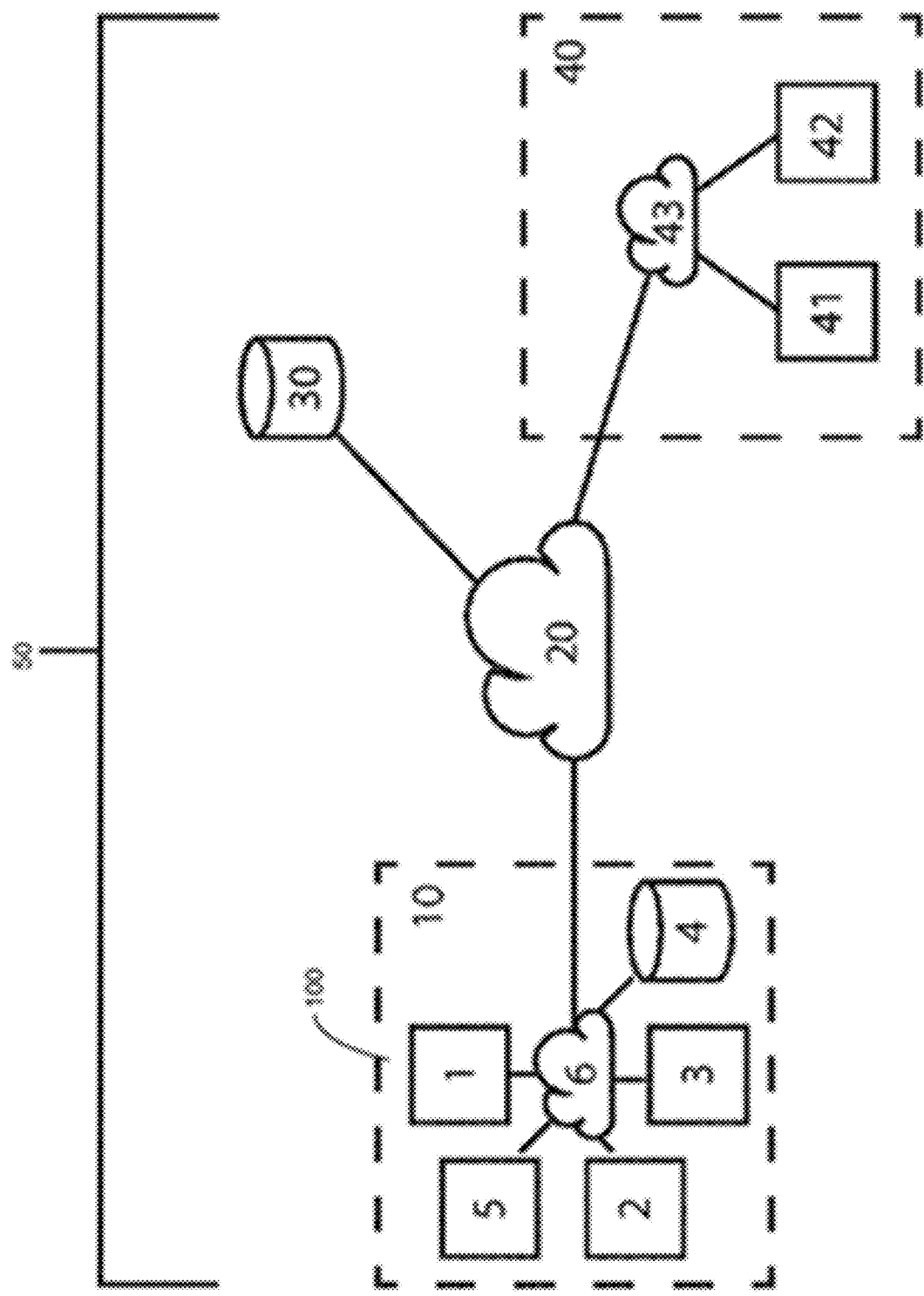
FIG. 1 shows a schematic diagram of an example cyber threat defense system.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

FIG. 1 illustrates an example cyber threat defense system protecting an example network. The example network FIG. 1 illustrates a network of computer systems 50 using a threat detection system. The system depicted by FIG. 1 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 1.

The computer 1 builds and maintains a dynamic, ever-changing model of the 'normal behavior' of each user and machine within the system 10. As described above, the approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches:

The machine learning learns what is normal within a network—it does not depend upon knowledge of previous attacks.

The machine learning thrives on the scale, complexity and diversity of modern businesses, where every device and person is slightly different.

The machine learning turns the innovation of attackers against them—any unusual activity is visible.

The machine learning constantly revisits assumptions about behavior, using probabilistic mathematics.

The machine learning is always up to date and not reliant on human input. Utilizing machine learning in cybersecurity technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

Thought: it uses past information and insights to form its judgments;

Real time: the system processes information as it goes; and

Self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber threat defense system's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cybersecurity is transformative:

Threats from within, which would otherwise go undetected, can be spotted, highlighted, contextually prioritized and isolated using these algorithms.

The application of machine learning has the potential to provide total network visibility and far greater detection levels, ensuring that networks have an internal defense mechanism.

Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview of Approach

In an embodiment, a closer look at the cyber threat defense system's machine learning algorithms and approaches is as follows.

The cyber threat defense system's probabilistic approach to cybersecurity is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include:

Server access;

Data access;

Timings of events;

Credential use;

DNS requests; and

Other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:
Analyzes behavior in the context of other similar devices on the network;
Algorithms identify naturally occurring groupings of devices—impossible to do manually; and
Simultaneously runs a number of different clustering methods to inform the models.

Network Topology

Any cyber threat detection system must also recognize that a network is far more than the sum of its individual parts, with much of its meaning contained in the relationships among its different entities, and that complex threats can often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cybersecurity has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine learning eliminates the dependence on signature-based approaches to cybersecurity, which are not working. The cyber threat defense system's technology can become a vital tool for security teams attempting to understand the scale of their network, observe levels of activity, and detect areas of potential weakness. These no longer need to be manually sought out, but are flagged by the automated system and ranked in terms of their significance.

Figure 2:
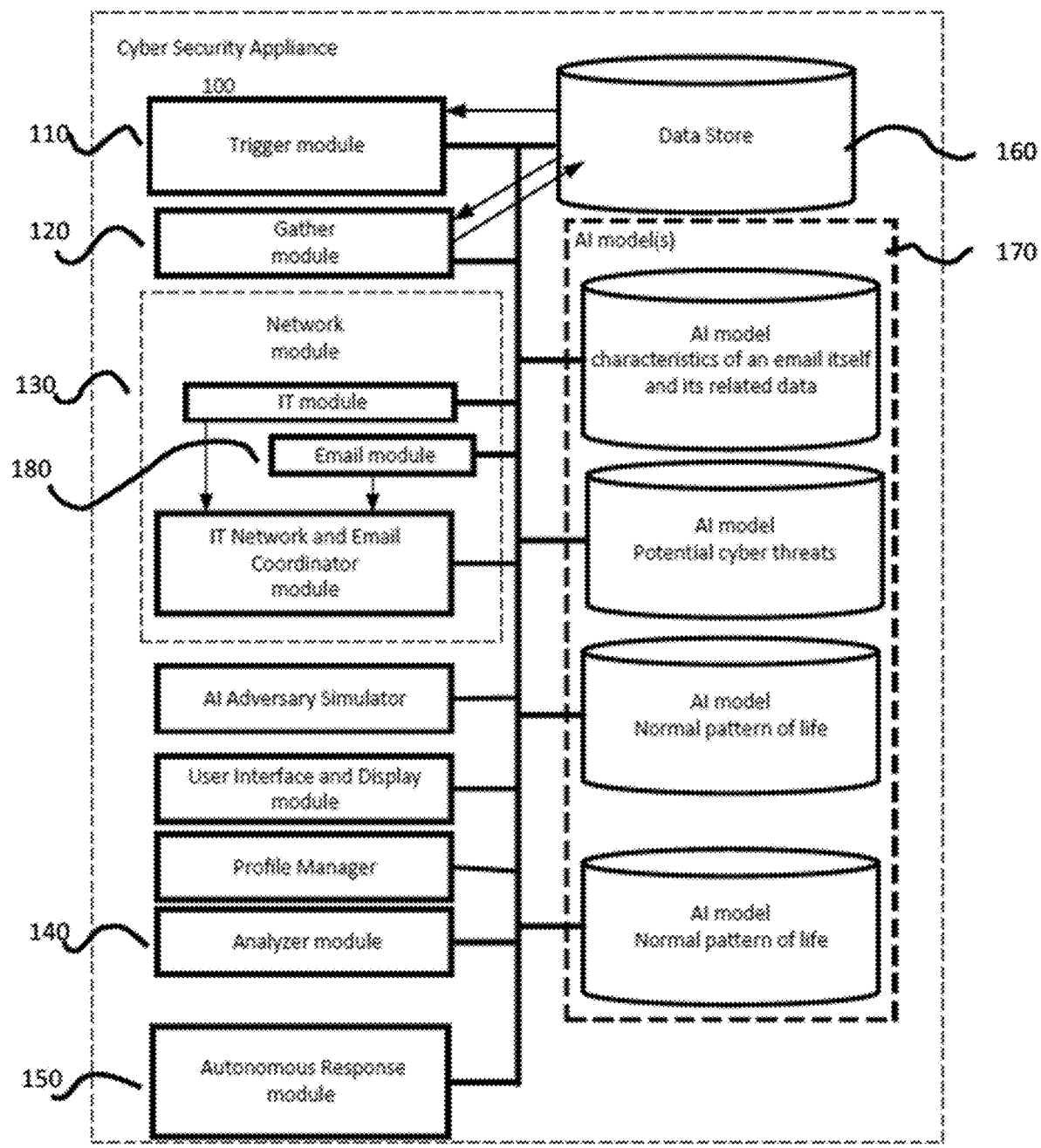
FIG. 2 shows a schematic diagram of example modules within a cyber threat defense system.

FIG. 2 shows some modules of an example cybersecurity appliance 100. Various Artificial Intelligence models and modules of a cybersecurity appliance 100 cooperate to protect a system, including but not limited to networked devices, from cyber threats. The cybersecurity appliance 100 may include a trigger module 110, a gatherer module 120, a network module 130, an analyzer module 140 (also referred to below as "AI Analyst"), an autonomous response module 150, a data store 160, and one or more Artificial Intelligence models 170, including one or more Artificial Intelligence models that are trained on potential cyber threats and their characteristics, symptoms, remediations, etc., one or more Artificial Intelligence models trained with machine learning on a normal pattern of life for entities in the network, and one or more Artificial Intelligence models trained on characteristics of network data and metadata associated with the network data. The one or more Artificial Intelligence models 170 may cooperate with multiple libraries of text and visual representations to populate visual representations, such as graphs, of a threat report. In some embodiments, the cybersecurity appliance 100 may also include an email module 180. An example network will be used to illustrate portions of a cybersecurity appliance 100, as further described below.

Referring to FIG. 2, the trigger module 110 may detect time stamped data indicating an event is occurring and then triggers that something unusual is happening. The gatherer module is triggered by specific events or alerts of i) an abnormal behaviour, ii) a suspicious activity, and iii) any combination of both. The trigger module may identify, with one or more AI models trained with machine learning on a normal network pattern of life for entities or devices in the network, at least one of i) an abnormal behaviour, ii) a suspicious activity, and iii) any combination of both, from one or more entities in the system.

The inline data may be gathered on the deployment when the traffic is observed. The gatherer module may initiate a collection of data to support or refute each of the one or more possible cyber threat hypotheses that could include this abnormal behavior or suspicious activity by the one or more AI models trained on possible cyber threats.

The gatherer module 120 cooperates with a data store 160. The data store stores comprehensive logs for network traffic observed. These logs can be filtered with complex logical queries and each IP packet can be interrogated on a vast number of metrics in the network information stored in the data store.

The data store 160 can store the metrics and previous threat alerts associated with network traffic for a period of time, which is, by default, at least 27 days. This corpus of data is fully searchable. The cybersecurity appliance 100 works with network probes to monitor network traffic and store and record the data and metadata associated with the network traffic in the data store.

The gatherer module 120 may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gatherer module for each possible hypothesis.

The gatherer module 120 may further extract data, at the request of the analyzer module 140, on each possible hypothetical threat that would include the abnormal behaviour or suspicious activity; and then, filter that collection of data down to relevant points of data to either 1) support or 2) refute each particular hypothesis of what the potential cyber threat, e.g. the suspicious activity and/or abnormal behaviour, relates to. The gatherer module and the data store can cooperate to store an inbound and outbound email flow received over a period of time as well as autonomous actions performed by the autonomous response module 150 on that email flow. The gatherer module may send the filtered down relevant points of data to either 1) support or 2) refute each particular hypothesis to the analyzer module, comprised of one or more algorithms used by the AI models trained with machine learning on possible cyber threats to make a determination on a probable likelihood of whether that particular hypothesis is supported or refuted.

A feedback loop of cooperation between the gatherer module and the analyzer module may be used to apply one or more Artificial Intelligence models 170 trained on different aspects of this process.

The network module ingests network data associated with network devices and network users and cooperates with the analyzer module 140 to determine which of a plurality of Artificial Intelligence models should be used to identify a potential cyber threat.

The analyzer module 140 can form one or more hypotheses on what are a possible set of activities including cyber threats that could include the identified abnormal behaviour and/or suspicious activity from the trigger module with one or more AI models trained with machine learning on possible cyber threats. The analyzer module may request further data from the gatherer module to perform this analysis. The analyzer module can cooperate with the one or more Artificial Intelligence models trained with machine learning on the network pattern of life for entities in the network to detect anomalous behavior which is detected as outside the usual pattern of life for each entity, such as a user, of the email network. The analyzer module can cooperate with the Artificial Intelligence models trained on potential cyber threats to detect suspicious network activity that exhibit traits that may suggest a malicious intent, such as network events taking place at unusual locations and/or times, unusual computer files leaving the network, unusual changes to computer files in the network, suspected crypto-mining behavior within the network, and/or suspicious or spam emails, as further described below. In addition, the gatherer module and the analyzer module may use a set of scripts to extract data on each possible hypothetical threat to supply to the analyzer module. The gatherer module and analyzer module may use a plurality of scripts to walk through a step-by-step process of what to collect to filter down to the relevant data points (from the potentially millions of data points occurring in the network) to make a decision what is required by the analyzer module.

The analyzer module 140 may further analyse a collection of system data, including metrics data, to support or refute each of the one or more possible cyber threat hypotheses that could include the identified abnormal behaviour and/or suspicious activity data with the one or more AI models trained with machine learning on possible cyber threats. The analyzer module then generates at least one or more supported possible cyber threat hypotheses from the possible set of cyber threat hypotheses as well as could include some hypotheses that were not supported/refuted.

The analyzer module 140 may get threat information from Open Source APIs as well as from databases as well as information trained into AI models. Also, probes collect the user activity and the email activity and then feed that activity to the network module to draw an understanding of the email activity and user activity in the email system.

The analyzer module 140 learns how expert humans tackle investigations into specific cyber threats. The analyzer module may use i) one or more AI models and/or ii) rules-based models and iii) combinations of both that are hosted within the plug-in appliance connecting to the network, as further described below.

The assessment module can cooperate with the autonomous response module 150 to determine an appropriate response to mitigate various cyber-attacks that could be occurring.

The analyzer module 140 can reference machine learning models that are trained on the normal behavior of network activity and user activity associated with at least the network system, where the analyzer module cooperates with the assessment module to determine a threat risk parameter that factors in 'the likelihood that a chain of one or more unusual behaviors of the network activity and user activity under analysis fall outside of derived normal benign behavior;' and thus, are likely malicious behavior.

The AI models 170 use data sources, such as simulations, database records, and actual monitoring of different human exemplar cases, as input to train the AI model on how to make a decision. The analyzer module also may utilize repetitive feedback, as time goes on, for the AI models trained with machine learning on possible cyber threats via reviewing a subsequent resulting analysis of the supported possible cyber threat hypothesis and supply that information to the training of the AI models trained with machine learning on possible cyber threats in order to reinforce the model's finding as correct or inaccurate.

Each hypothesis has various supporting points of data and other metrics associated with that possible threat, and a machine learning algorithm will look at the relevant points of data to support or refute that particular hypothesis of what the suspicious activity and/or abnormal behaviour relates to.

The analyzer module 140 may perform analysis of internal and external data including readout from machine learning models, which output a likelihood of the suspicious activity and/or abnormal behaviour related for each hypothesis on what the suspicious activity and/or abnormal behaviour relates to with other supporting data to support or refute that hypothesis.

An assessment module (not shown) assigns a probability, or confidence level, to each given cyber threat hypothesis that is supported, and a threat level posed by that cyber threat hypothesis, which includes this abnormal behaviour or suspicious activity, with the one or more AI models trained on possible cyber threats. The assessment module may rank supported candidate cyber threat hypotheses by a combination of likelihood that this candidate cyber threat hypothesis is supported as well as a severity threat level of this incident type.

A formatting module (not shown) can be coded to generate a report with the identified critical devices connecting to the virtualized instance of the network that should have the priority to allocate security resources to them. The formatting module can include an autonomous response module 150, such as an autonomous email-report composer, that cooperates with the various AI models and modules of the cybersecurity appliance 100 as well as at least a set of one or more libraries of sets of prewritten text and visual representations to populate on templates of pages in the email threat report. The autonomous email-report composer can compose an email threat report on cyber threats that is composed in a human-readable format with natural language prose, terminology, and level of detail on the cyber threats aimed at a target audience being able to understand the terminology and the detail. The modules and AI models cooperate with the autonomous email-report composer to indicate in the email threat report, for example, an attack's 1) purpose and/or 2) targeted group (such as members of the finance team, or high-level employees). In alternative embodiments, the autonomous response module 150 may cooperate with other modules to cause an autonomous mitigation action, such as quarantining at-risk systems, when it is determined that there is a sufficiently high probability (for example, when a calculated score exceeds a threshold value) that the at-risk system has been breached.

The formatting module may format, present a rank for, and output the current threat report from a template of a plurality of report templates, that is outputted for a human user's consumption in a medium of, any of 1) a printable report, 2) presented digitally on a user interface, 3) in a machine readable format for further use in machine-learning reinforcement and refinement, and 4) any combination of the three.

In preferred embodiments, the analyzer module 140 includes AI models trained to detect particular cyber threats including: i) network events taking place at unusual locations and/or times; ii) unusual changes to computer files in the network; iii) unusual computer files leaving the network; iv) suspected crypto-mining behavior within the network, and/or v) suspicious or spam emails. As indicated above, each analyzer module AI model may output a likelihood of each of these suspicious activities and/or abnormal behaviors which are provided to a classifier, such as one or more AI models trained on possible cyber threats. The classifier may then determine whether a particular cyber threat hypothesis is supported, and determine a threat level posed by that cyber threat hypothesis.

Analytical techniques employed by the analyzer module AI models to detect these cyber threats are further described below.

I) Continuous Gaussian Construction for Anomaly Detection

In some embodiments, the cyber defense system includes an AI model trained to detect network events taking place at unusual locations and/or times using a Continuous Gaussian Construction tool.

The cyber threat detection system is configured to detect anomalies via the Continuous Gaussian Construction tool, which identifies whether an activity is anomalous when mapped onto a given continuous shape. This Continuous Gaussian Construction tool takes a timeframe, for example one week, and maps network events (geographically and/or otherwise) onto the shape given. This Continuous Gaussian Construction tool then calculates the likelihood of events taking place at every point on the surface by generating a Gaussian function for each possible point on the surface. The Continuous Gaussian Construction tool can be used to identify unusual locations for network events by mapping the network events over a given timeframe to a globe and then placing all future events onto the globe surface and observing the likelihood from the generated Gaussian functions. The Continuous Gaussian Construction tool can be used in ICS network events, where all events over a given timeframe are mapped onto a circle that represents a 7-day period. A line of likelihood can be mapped onto the circle, and any new events afterward can be seen as anomalous if they lie outside the circle. The method can use a torus when taking into account queries with two parameters (e.g. hour and day).

Further to the above, the height of each Gaussian function may be normalized to provide a probability distribution scale from 0 to 1, enabling any point on the surface to be allocated a probability value of from 0 to 1. In other words, the AI model creates a "heat map" that indicates the locations and times where a network event is likely to occur, thereby enabling the system to determine whether a particular network event is anomalous, as further described below.

The particular surface depends on the event being analyzed. The topological structure of the surface represents certain assumptions relating to the event and the surface is typically periodic/cyclical such that events repeated at the same time/location overlap on the surface.

Figure 3B:
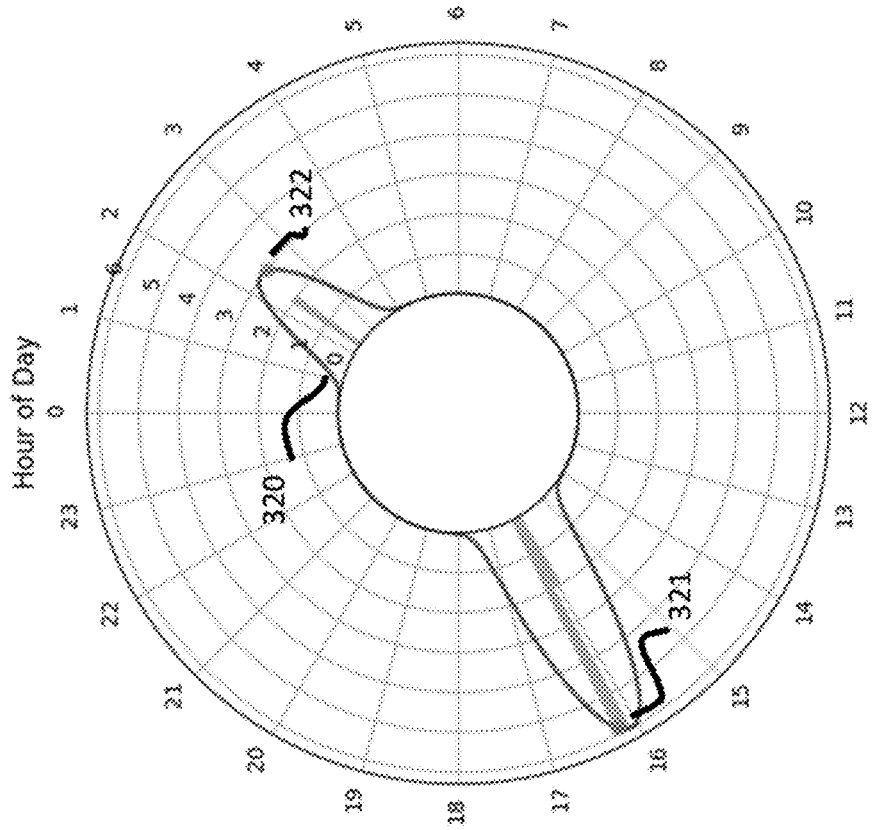
FIG. 3B shows a second example of a topographical surface that illustrates the probability of network events occurring at particular hours of the day.
Figure 3A:
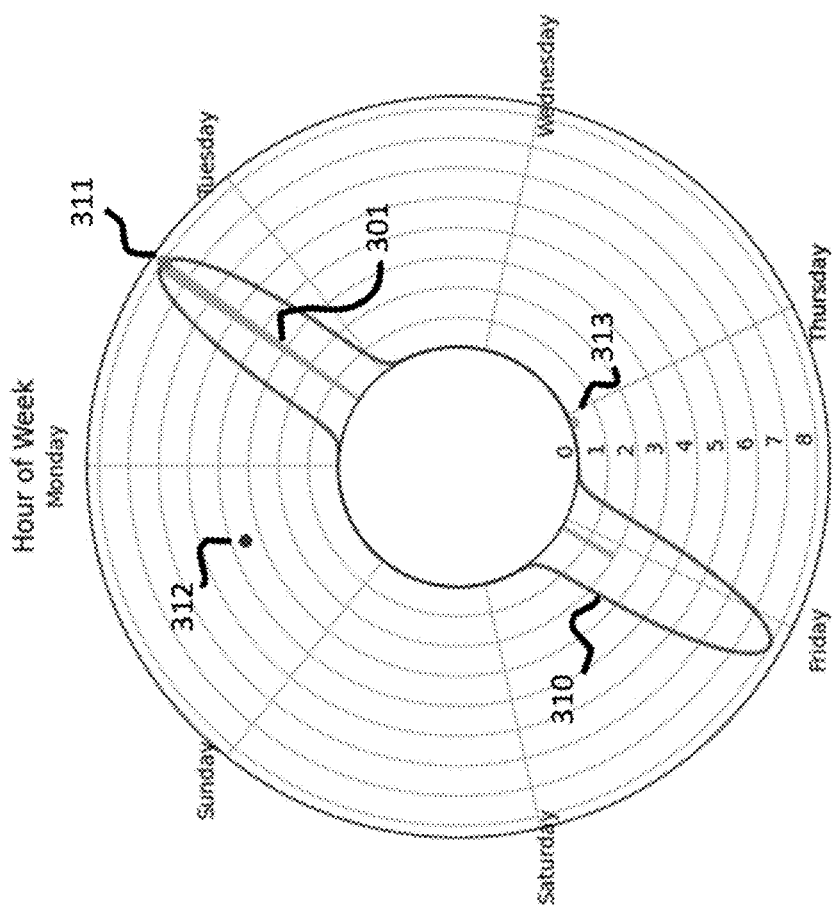
FIG. 3A shows a first example of a topographical surface that illustrates the probability of network events occurring at particular hours of the week.

Two examples are shown in FIGS. 3A and 3B, where the mapped surface is a circle. Network events may be mapped to a circle if they relate to a single periodic variable, such as the days of the week.

In the example of FIG. 3A, the hours of the week are displayed circumferentially while the count of ICS events is displayed radially. Past ICS events 301 are used to calculate a probability distribution 310 that represents the likelihood that a particular number of ICS events occur at particular hours in the week. It can be seen from FIG. 3A that ICS events typically occur late in the day on Mondays, or early in the day on Fridays. By calculating a probability distribution 310 for the expected time and frequency of ICS events, the system can identify anomalous ICS events by determining the expectedness of an ICS event based on the probability distribution at that time.

A first set of observed ICS events 311 lies on the probability distribution 310, and so is not considered to be anomalous. In other words, these network events do not occur at an unusual time of the week and do not occur with unusual frequency. However, a second set of observed ICS events 312 lies outside the probability distribution 310, and so these network events may be marked as anomalous events because they occur at an unusual time of the week. A third set of ICS events 313 occurs at an unusual time of the week, and so may also be marked as anomalous events. However, the frequency of those events result in the wider system considering the third set of events 313 to relate to legitimate, but unusual, user activity and therefore not be indicative of a cybersecurity threat.

FIG. 3B is similar to FIG. 3A, except the hours of the day are displayed circumferentially. A probability distribution 320 indicates the likelihood that a particular number of ICS events occur at particular hours in the day. A first set of observed ICS events 321 occurs as expected at 4 pm, and lies on the probability distribution 320. Although the number of observed ICS events in the second set of requests 322 is higher than historically, the second set of requests 322 still falls within the probability distribution 320 and so is not marked as being anomalous.

Figure 4:
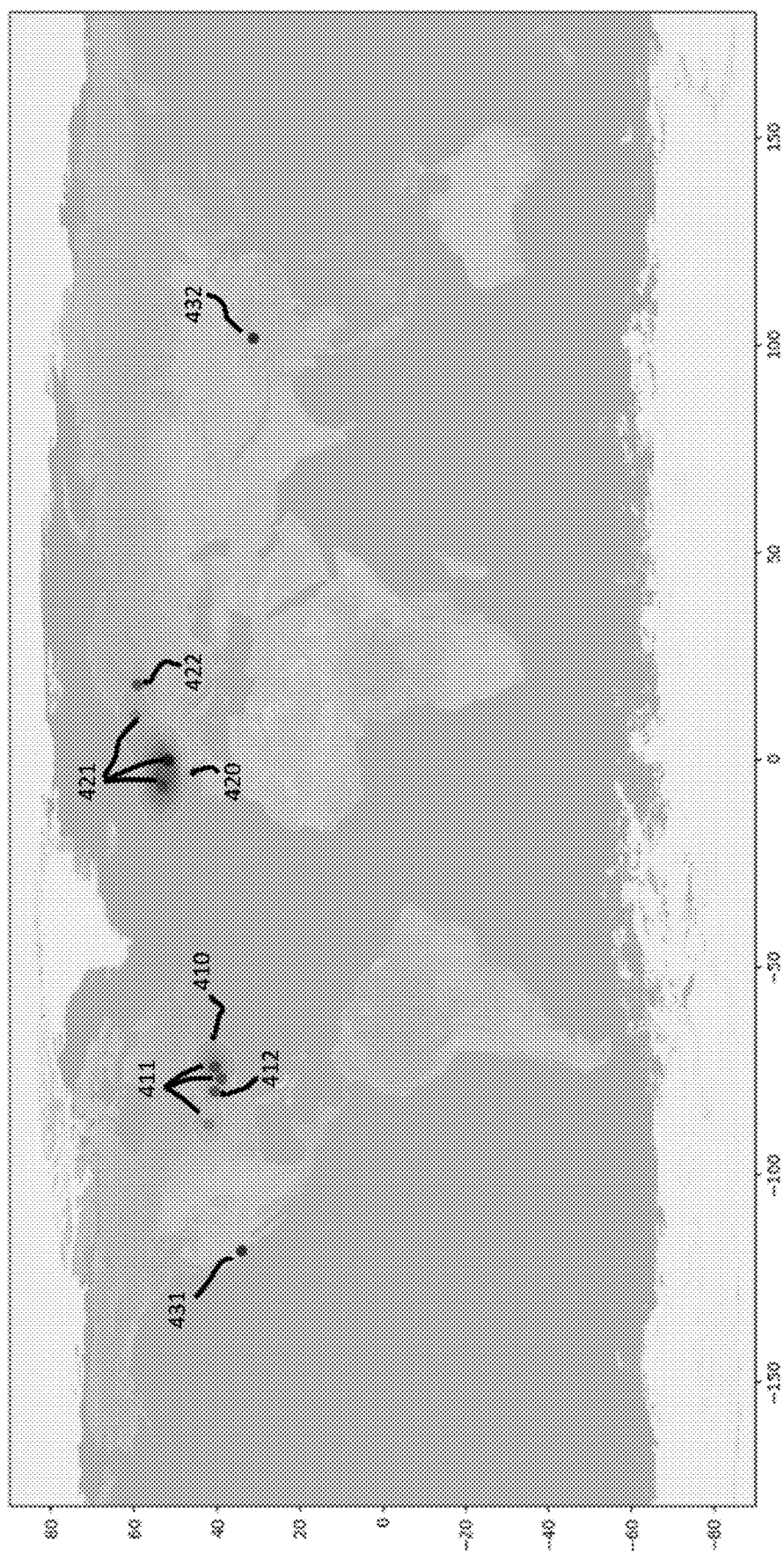
FIG. 4 shows a third example of a topographical surface that illustrates the probability of network events occurring at particular locations.
Figure 5:
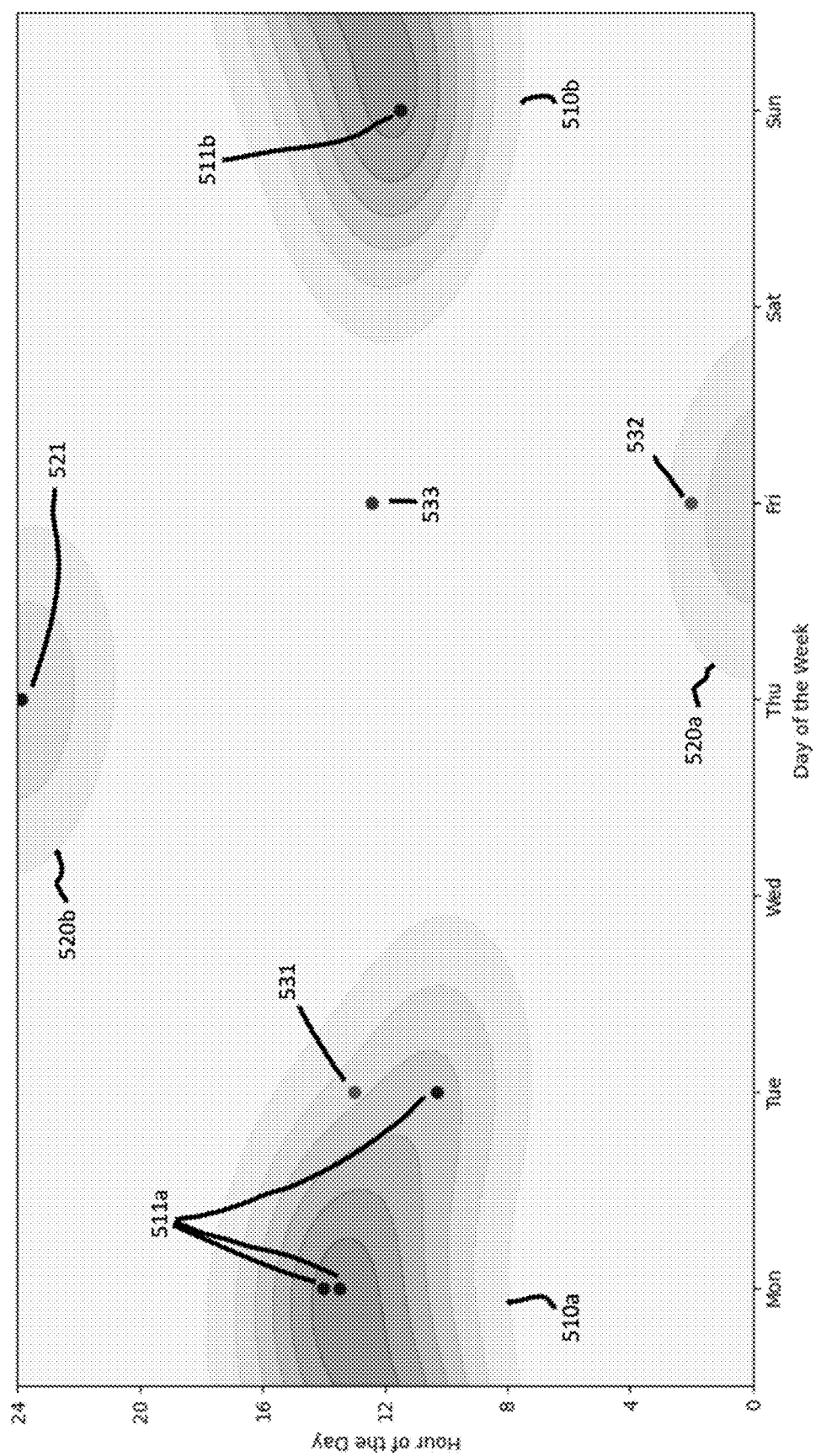
FIG. 5 shows a fourth example of a topographical surface that illustrates the probability of network events occurring at particular days and times during the week.

In the examples of FIGS. 4 and 5, the probability distribution is mapped to an entire surface.

In FIG. 4, the mapped surface is a sphere. Network events may be mapped to a sphere if they relate, for example, to spherical coordinates, such network events relating to a global geographic location.

It will be noted that in FIG. 4 the 3-dimensional sphere is represented in two dimensions. Accordingly, in the example of FIG. 4 degrees of longitude are represented on the x-axis and degrees of latitude are represented on the y-axis. The probability distribution includes a first probability density 410, which is plotted based on a first set of previously observed events 411, and indicates that network events are likely to occur in the North East of the United States of America. A second probability density 420 is plotted based on a second set of previously observed events 421, and indicates that network events are also likely to occur in Northern Europe.

Observed network events 412, 422 both fall respectively within probability densities 410, 420 and so these events are not considered to be anomalous. However, neither observed network event 431, which occurs on the West Coast of the United States of America, nor network event 432, which occurs in central China, fall within probability densities 410 and 420. Accordingly, network events 431,432 are marked as being anomalous.

A final example is shown in FIG. 5, where the mapped surface is a torus. Network events may be mapped to a torus if they relate to multiple periodic variables (such as time of day, and day of the week).

It will be noted that in FIG. 5 the 3-dimensional torus is represented in two dimensions. Accordingly, in the example of FIG. 5, the day of the week (i.e. the radius of revolution) is represented on the x-axis and the hour of the day (i.e. the torus cross-sectional radius) is represented on the y-axis. A first probability density, defined within a first set of probability contours 510a, 510b, is plotted based on a first set of previously observed events 511a,511b, and indicates that network events are likely to occur around 8 am to 4 pm on Sunday and Monday. A second probability density, defined within a second set of probability contours 520a,520b, is plotted based on a second set of previously observed events 521, and indicates that network events are also likely to occur around midnight between 10 pm on Thursday and 2 am on Friday.

Observed network events 531,532 fall respectively within probability contours 510a,520a and so these events are not considered to be anomalous. However, observed network event 533, which occurs at 12 noon on Friday does not fall within any of the probability densities and so network event 533 is marked as being anomalous.

It will be appreciated by the skilled person that the examples of surfaces provided above are exemplary, and n-dimensional shapes may also be used.

Each of the mapped surfaces is cyclical, or repetitious, in nature in order to allow repeating or periodic events to be overlapped on the surface. This enables events to be compared continuously through time and enables the system to identify certain network events that occur regularly, such as certain business processes being scheduled at regular times in the week/month/year or a particular user logging on at a predictable location and time each day.

II) Ransomware Detection

In some embodiments, the cyber defense system includes an AI model trained to detect unusual changes to computer files in the network using a Ransomware Detection tool.

Ransomware typically extracts files, encrypts them, and then re-uploads the files with a new extension, which are no longer accessible to a user. However, ransomware can make use of a wide range of processes making it difficult to detect.

The cyber threat detection platform is configured to detect Ransomware. This Ransomware Detection tool simplifies the cyber threat detection platform's way for detecting ransomware to make it faster and computationally less intensive. The Ransomware Detection tool uses an existing AI Analyst classifier that breaks down strings into subwords and letters to identify anomalies. The Ransomware Detection tool takes files that have been recently observed and sorts them alphabetically to establish pairs of files that have the same name and checks to see if the file extension, mimetype or byte-size has changed recently. The Ransomware Detection tool then takes those pairs and performs analysis on the file extension to see if it is likely a ransomware extension. The Ransomware Detection tool attempts to break down file extensions into subwords and, if not possible, individual letters and then looks for any frequency of use/proportion of files on the network. File extensions that are not divisible into subwords are deemed more anomalous than those that can break down into letters; and therefore, more likely to be ransomware. There is also a defined whitelist of known standard file extensions to minimize false positives. (AI analyst can use the Ransomware Detection tool on IT networks and other networks).

The advantage of the Ransomware Detection tool is that detecting ransomware is simplified, made faster and is computationally less intensive. Another advantage is that more reliable results are produced compared to known approaches, which try to track individual changes to each file. This is because individual changes to each file tend to be much more specific to a given pattern of changes, which may not occur.

III) Interesting File Detection

In some embodiments, the cyber defense system includes an AI model trained to detect unusual computer files leaving the network using an Interesting File Detection tool.

The cyber threat detection platform is configured to analyze files and their metadata and content to determine a ranked list of whether that file is interesting/worthy of further investigation. When files are transferred over unencrypted networking protocols (which may be either internal-to-internal or internal-to-external) the cyber threat detection platform can use an interesting file detector to identify a list of transferred files and derive metadata about them. The Interesting File Detection tool identifies features in the metadata about the file (such as the extension, the type of file, the endpoint it is transferred to, the protocol used) and performs Natural Language Processing on the features, such as file names and file content, to establish a ranking of 'interesting' files that have left the network. AI analyst uses the interesting file detector for various IT networks and an email threat detection system for Data Loss Prevention via use of the interesting file detector.

Further to the above, the Interesting File Detection tool identifies a list of computer files that are transferred over unencrypted networking protocols—i.e. from internal to a network to external to the network—and derives metadata for each transferred computer file. A classifier is used to identify features in the metadata about the file, which may include: the file extension, the type of file, the network endpoint the file is transferred to, and the communication protocol used to transfer the file.

Detecting the loss of important files is a multidimensional problem, and so the Natural Language processing may include one or more of the following techniques/methods:

Identifying anomalous patterns in the sending of large volumes of files: for example identifying files with an anomalous file extensions (for example, ZIP files among JPEG files), or anomalous/interesting file names (for example, identifying files relating to finance in amongst pictures of fruit)

Analyzing the frequency at which identified documents are sent, the name of the recipient, the name of the recipient company, the format/layout of the document Analyzing text strings in the unencrypted content of the sent documents to identify any text string resembling sensitive information, such as a computer password, company employee name, etc.

Identifying metadata that is "black listed"—i.e. content/file types/etc. that are known to be suspicious.

Identifying file names that have been auto-generated by computer with random letters/numbers, or written by a human user to include real/abbreviated/meaningful words/text strings.

Identifying the presence of anomalous or unusual language entities, e.g. strings related to organisations, quantities, numbers, monetary values, etc.

Identifying anomalous file properties, e.g. file sizes anomalously high or low.

The Interesting File Detection tool may allocate each file with a score (for example, 1-100) for each of the above processing methods that have been used. Unusual, or anomalous, files will obtain a higher score, with a very high score (for example, 99) is given to any file that includes black-listed metadata. The score for each technique above is summed to produce a final score, and the files are then ranked from highest score to lowest to provide a ranked list of files that are the most interesting and worthy of further investigation to determine whether a particular device has been compromised.

IV) Crypto-Mining Detection

In some embodiments, the cyber defense system includes an AI model trained to detect suspected crypto-mining behavior within the network using a Crypto-mining Detection tool.

The cyber threat detection platform is configured to data mine communication protocols using encryption in order to determining mining hosts. The cyber threat detection platform may also detect unencrypted mining communication protocols—e.g. JSON-RPC. The cyber threat detection platform can use a Crypto-mining Detection tool that does not need to see the actual mining communication protocol, making the Crypto-mining Detection tool more future proof. The Crypto-mining Detection tool derives metadata for each identified host and uses an Ngram classifier trained on cryptocurrency words and known hosts, and additional Natural Language Processing, to detect hostnames that are likely mining hosts. The Crypto-mining Detection tool uses the Ngram classifier to locate crypto-mining activity which is taking place over encrypted or obfuscated channels. Note, an AI analyst can use the crypto-mining detector.

Further to the above, the Natural Language processing may include one or more of the following techniques/methods:

Identifying properties of a host name, and all features of network data traffic that are not connected.

Identifying the network end points for each device and identify anomalous end points that no other devices in the network are connected to.

Identifying "black listed" end points that are known to be used for crypto-mining.

Analyzing text strings in SSL encryption and subject lines.

Using an NGram classifier to identify all words in a host name and split the host name into fractions, compute a likelihood that the host name is associated with cryptocurrencies and crypto-mining, and identify new possibilities for host names based on known crypto-currency jargon.

Similarly to the above, the Crypto-mining Detection tool may allocate each host with a score (for example, 1-100) for each of the above processing methods that have been used. Unusual, or anomalous, hosts will obtain a higher score, with a very high score (for example, 99) given to any host that includes black-listed metadata. The score for each technique above is summed to produce a final score, and the hosts are then ranked from highest score to lowest to provide a ranked list of hosts that are worthy of further investigation to determine whether a particular device has been compromised.

V) Detecting Spam Via Network Activity

In some embodiments, the cyber defense system includes an AI model trained to detect suspicious or spam emails using a Detecting Spam via Network Activity tool.

Embodiments of the invention having a Detecting Spam via Network Activity tool further comprise an email module 180 that cooperates with the network module 130 to get derive a normal email pattern of life from the network activity of a user in order to determine whether an email is spam or not.

The cyber threat detection platform is configured to a spike in network activity and intelligently determine whether a device is compromised and then take action to mitigate the compromised device. Compromised devices are often observed sending spam emails after an initial infection. Often, this infection can take place outside of the monitored network (e.g. at a coffee shop or at home) and the device is then reintroduced to the network already compromised. The Detecting Spam via Network Activity tool looks for network activity using unencrypted email protocols anomalously, which may indicate spam. The Detecting Spam via Network Activity tool performs natural language processing on the visible email header information and also performs feature analysis on 5-10 aspects such as the number of emails sent, the volume of recipients (one sender to 100s of recipients), the kind of recipients (lots of freemail addresses). The analyzer module can use the network activity to detect a compromised device that is compromised outside of the protected network but now hooks back into the network.

Further to the above, the Detecting Spam via Network Activity tool identifies a list of sent messages from networked devices, derives metadata associated with those messages, and uses a classifier to identify features in the metadata about the message.

The Detecting Spam via Network Activity tool may perform one or more of the following techniques/methods to identify anomalous messaging by networked devices:

Identify anomalous network activity using unencrypted email protocols, which may indicate spam.

Perform Natural Language Processing on unencrypted email header information to identify anomalous senders, recipients, subject line text, attachments, etc.

Perform feature analysis on 5-10 metadata features, which may include: the number of emails sent by a particular device (some devices, e.g. printers, may typically only send a few emails, but if compromised may suddenly start sending thousands of emails), the volume of recipients (for example one sender emailing hundreds of recipients), the type of recipients (for example, the presence of may "free-mail", rather than corporate, email addresses), the proportion of blocked/undeliverable emails sent, the devices connected to many more, or unique, network endpoints, "black listed" metadata (for example content/text strings/etc. that are known to be suspicious).

The "black listed" metadata can capture text strings spanning multiple languages, including English, Spanish, Portuguese, Italian, French and German in order to capture more instances of spamming.

Similarly to the above, the Detecting Spam via Network Activity tool may allocate each email message with a score (for example, 1-100) for each of the above processing methods that have been used. Unusual, or anomalous, messages will obtain a higher score, with a very high score (for example, 99) given to any message that includes black-listed metadata. The score for each technique above is summed to produce a final score, and the messages are then ranked from highest score to lowest to provide a ranked list of messages that are worthy of further investigation to determine whether a particular device has been compromised.

In some embodiments, each of the tools described above are modular, and so may operate independently of the other tools described herein. In addition, although the above tools are described as being included in the analyzer module, it will be understood that these modules may also be implemented separately to the analyzer module.

The outputs of the analyzer module AI models described above can be provided to a classifier, such as the one or more AI models trained on cyber threats and their behavior, to try to determine if a potential cyber threat is causing detected unusual behaviors. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cybersecurity appliance is configurable in a user interface, by a user, enabling what type of automatic response actions, if any, the cybersecurity appliance may take when different types of cyber threats, indicated by the pattern of behaviors under analysis, that are equal to or above a configurable level of threat posed by this malicious actor.

The AI models may perform the threat detection through a probabilistic change in a normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and potentially IT network raw sources of data, a large number of metrics can be derived each producing time series data for the given metric.

At its core, the cybersecurity appliance 100 mathematically characterizes what constitutes 'normal' behavior in line with the normal pattern of life for that entity and organization based on the analysis of a large number/set of different measures of a device's network behavior. The cybersecurity appliance 100 can build a sophisticated 'pattern of life'—that understands what represents normality for every person, device, email activity, and network activity in the system being protected by the cybersecurity appliance 100.

The various modules cooperate with each other, the AI models, and the data store to carry out the operations discussed herein. The trigger module, the AI models, the gatherer module, the analyzer module, the assessment module, the formatting module, and the data store cooperate to improve the analysis and formalized report generation with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report.

One or more processing units are configured to execute software instructions associated with the intelligent-adversary simulator, the formatting module, other modules, and models in the cybersecurity appliance 100.

One or more non-transitory storage mediums are configured to store at least software associated with the intelligent-adversary simulator, the other modules, and AI models.

An Example Method

The threat detection system shall now be described in further detail with reference to a flow of the process carried out by the threat detection system, which is shown in FIG. 6. The example process of FIG. 6 enables automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:
Raw network IP traffic captured from an IP or other network TAP or SPAN port;
Machine generated log files;
Building access ("swipe card") systems;
IP or non IP data flowing over an Industrial Control System (ICS) distributed network;
Individual machine, peripheral or component power usage;
Telecommunication signal strength; and/or
Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:
  The number of bytes of data entering or leaving a networked device per time interval.
  File access.
  The commonality/rarity of a communications process
  Invalid SSL certification.
  Failed authorization attempt.
  Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:
  The number of multicasts per time interval originating from a networked device and intended to reach publicly addressable IP ranges.
  The number of internal link-local IP Broadcast requests originating from a networked device.
  The size of the packet payload data.
  The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:
  The number of DNS requests a networked device generates per time interval, again either to any definable target network range or in total.
  The number of SMTP, POP or IMAP logins or login failures a machine generates per time interval.
  The number of LDAP logins or login failures a generated.
  Data transferred via file sharing protocols such as SMB, SMB2, FTP, etc.
  Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and/or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning/Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system can communicate with the server(s). The client computing system can include, for example, the software application or the hardware-based system in which the client computing system may be able to exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

Aspects of the invention may be described by the following numbered clauses:

CLAUSES

1. A cyber threat defense system comprising:
    a network module configured to ingest network data associated with network structures, network devices and network users;
    an analyzer module configured to cooperate with one or more machine learning models and the network module, wherein a first machine learning model is configured to evaluate the network data, identify metrics associated with the network data and then cooperate with the network module to output a score indicative of whether anomalous network data metrics are caused by a cyber threat; and
    an artificial intelligence classifier configured to receive outputs of each of the one or more machine learning models, determine a probability that a cybersecurity breach has occurred, and transmit a message to an autonomous response module based on the determined probability of a cybersecurity breach.
2. The system of clause 1, further comprising: a probability calculation module configured to calculate a probability distribution for the network data metrics, wherein the network data metrics are associated with a time and/or location of a network event and wherein the first of the one or more machine learning models is configured to determine a score based on a comparison between the probability distribution and the network data metrics.
3. The system of clause 2, wherein the first machine learning model is configured to map the network data metrics and the probability distribution to a continuous shape and wherein the artificial intelligence classifier is configured to identify anomalous network data metrics based on a comparison between the probability distribution and the network data metrics.
4. The system of clause 3, wherein the first machine learning model is configured to identify anomalous times and/or locations by determining which of the network data metrics fall outside a probability density in the probability distribution when mapped on the surface
5. The system of clause 3 or 4, wherein the surface is a circle if the network data metrics include a single periodic variable, the surface may be a torus if the network data metrics include multiple periodic variables, and the surface may be a sphere if the network data metrics include spherical coordinates
6. The system of any preceding clause, the system further comprising: a natural language processing module configured to analyse the network data metrics, wherein the network data metrics are associated with file names and/or file extensions of computer files that have left the network, and wherein a second of the one or more machine learning models is configured to determine a score based on predetermined text strings identified in the file names and/or file extension and/or content of a computer file.
7. The system of clause 6, wherein the second machine learning model is further configured to determine a score based on one or more of: the frequency that the computer files have been sent externally to the network; the name of the recipient; the name of the recipient company; and the format of the computer file.
8. The system of clause 6 or 7, wherein the second machine learning model is further configured to determine a score based on predetermined text strings that include one or more of: any text string substantially the same as computer passwords, company employee names, or other sensitive information; any text string that is known to be suspicious; and predetermined text strings that include file names that have random letters and/or numbers that are of no significance to a human user.
9. The system of any preceding clause, further comprising: a natural language processing module configured to analyse the network data metrics, wherein the network data metrics are associated with file extensions and/or mime types of computer files that have been altered, and wherein a third of the one or more machine learning models is configured to determine a score based on predetermined text strings identified in the file extensions and/or mime types.
10. The system of clause 9, wherein the third machine learning model is configured to determine a score based on an analysis of identified pairs of computer files having file extensions that include substantially the same text string.
11. The system of clause 9 or 10, wherein the third machine learning model is configured to determine a score based on one or more of: predetermined text strings that include file extensions that cannot be divided into subwords; file extensions that are known to be safe; and the frequency and/or proportion of computer files on the network that have the same file extension.
12. The system of any preceding clause further comprising: a natural language processing module configured to analyse the network data metrics, wherein the one or more network data metrics are associated with network communication protocols, and wherein a fourth of the one or more machine learning models is configured to determine a score based on predetermined text strings identified in the network communication protocols.
13. The system of clause 12, wherein the fourth machine learning model is configured to determine a score based on one or more of: the properties of a host name, features of unconnected network data traffic, network end points that no other devices in the network are connected to; end points that are known to be used for crypto-mining; anomalous text strings in Secure Sockets Layer encryption and subject lines; host names including text strings that are substantially the same as known text strings associated with crypto-currencies and crypto-mining.
14. The system of any preceding clause, further comprising: an email module configured to ingest email data and a natural language processing module, wherein the analyzer module is further configured to receive the email data, wherein a fifth of the one or more machine learning models is configured to identify metrics associated with unencrypted email protocols and/or unencrypted email header information, and wherein the fifth machine learning model is further configured to determine a score based on predetermined text strings identified in the unencrypted email protocols and/or unencrypted email header information, wherein the fifth machine learning model is further configured to utilize one or more unsupervised machine learning algorithms.
15. The system of clause 14, wherein the fifth machine learning model is configured to determine a score based on one or more of: anomalous network activity identified using unencrypted email protocols; anomalous senders of email messages; anomalous recipients of email messages; anomalous subject line text; and anomalous attachments.
16. The system of clause 14 or 15, wherein the further machine learning model is configured to determine a score based on one or more of: the number of emails sent by a particular device; the volume of recipients; the type of recipients; the proportion of blocked/undeliverable emails sent; devices connected to unique network endpoints; and predetermined text strings that are known to be suspicious.
17. The system of any preceding clause, further comprising: a data store configured to store historical network data, two or more machine learning models, and wherein each machine learning model is further configured to receive the historical network data.
18. The system of any preceding clause, where the artificial intelligence classifier is configured to determine a probability that a cybersecurity breach has occurred using a Bayes filter to identify normal behavior for the network structures, network devices, and network users.
19. The system of any preceding clause, wherein the analyzer module is further configured to form a hypothesis relating to whether a cybersecurity breach has occurred and provide outputs of the one or more machine learning models to the artificial intelligence classifier when the hypothesis is resolved to thereby continually train the artificial intelligence classifier during its operational life or deployment to identify cybersecurity breaches.
20. The system of any preceding clause, wherein the autonomous response module is configured to transmit a report identifying one or more identified network devices that have been compromised by a cybersecurity breach, and to cause an autonomous mitigation action directed to the one or more identified network devices that have been compromised by a cybersecurity breach when the score is above a threshold amount.
21. The system of any preceding clause, wherein the analyzer module is further configured to model the normal behavior of network structures, network devices and network users using one or more clustering methods, including matrix based clustering, density based clustering and hierarchical clustering techniques.
22. A cyber threat defense method comprising:
    ingesting network data associated with network structures, network devices and network users;
    evaluating the network data with a first of one or more machine learning models, identifying metrics associated with the network data, and outputting a score indicative of whether anomalous network data metrics are caused by a cyber threat;
    receiving output scores from each of the one or more machine learning models;
    determining a probability that a cybersecurity breach has occurred; and
    transmitting a message to an autonomous response module based on the determined probability of a cybersecurity breach.
23. The method of clause 22, further comprising calculating a probability distribution for the network data metrics, wherein the network data metrics are associated with a time and/or location of a network event, and determining a score with the first machine learning model is based on a comparison between the probability distribution and the network data metrics.
24. The method of clause 23, wherein the first machine learning model compares between the probability distribution and the network data metrics by mapping the network data metrics and the corresponding probability distribution to a surface.
25. The method of clause 24, wherein the first machine learning model maps the network data metrics and the probability distribution to a continuous shape and wherein the artificial intelligence classifier compares the network data metrics with the probability distribution to identify anomalous network data metrics.
26. The method of clause 24 or 25, wherein the surface is a circle if the network data metrics include a single periodic variable, the surface may be a torus if the network data metrics include multiple periodic variables, and the surface may be a sphere if the network data metrics include spherical coordinates.
27. The method of any preceding clause, further comprising analyzing the network data metrics, wherein the network data metrics are associated with file names and/or file extensions of computer files that have left the network, and determining a score with a second machine learning model based on predetermined text strings identified in the file names and/or file extension and/or content of a computer file.
28. The method of clause 27, wherein the second machine learning model determines a score based on one or more of: the frequency that the computer files have been sent externally to the network; the name of the recipient; the name of the recipient company; and the format of the computer file.
29. The method of clauses 27 or 28, wherein the second machine learning model determines a score based on predetermined text strings that include one or more of: any text string substantially the same as computer passwords, company employee names, or other sensitive information; any text string that is known to be suspicious; and predetermined text strings that include file names that have random letters and/or numbers that are of no significance to a human user.
30. The method of any preceding clause, further comprising analyzing the network data metrics, wherein the network data metrics are associated with file extensions and/or mime types of computer files that have been altered, and determining a score with a third machine learning model based on predetermined text strings identified in the file extensions and/or mime types.
31. The method of clause 30, wherein the third machine learning model determines a score based on an analysis of identified pairs of computer files having file extensions that include substantially the same text string.
32. The method of clause 30 or 31, wherein the third machine learning model determines a score based on one or more of: predetermined text strings that include file extensions that cannot be divided into subwords; file extensions that are known to be safe; and the frequency and/or proportion of computer files on the network that have the same file extension.
33. The method of any preceding clause, further comprising analyzing the network data metrics, wherein the one or more network data metrics are associated with network communication protocols, and determining a score with a fourth machine learning model based on predetermined text strings identified in the network communication protocols.

34. The method of clause 33, wherein the fourth machine learning model determines a score based on one or more of: the properties of a host name, features of unconnected network data traffic, network end points that no other devices in the network are connected to; end points that are known to be used for crypto-mining; anomalous text strings in Secure Sockets Layer encryption and subject lines; host names including text strings that are substantially the same as known text strings associated with crypto-currencies and crypto-mining.

35. The method of any preceding clause, further comprising ingesting email data, receiving the email data at a fifth machine learning model, identifying metrics associated with unencrypted email protocols and/or unencrypted email header information, determining a score with the fifth machine learning model based on predetermined text strings identified in the unencrypted email protocols and/or unencrypted email header information, and utilizing one or more unsupervised machine learning algorithms.

36. The method of clause 35, wherein the fifth machine learning model determines a score based on one or more of: anomalous network activity identified using unencrypted email protocols; anomalous senders of email messages; anomalous recipients of email messages; anomalous subject line text; and anomalous attachments.

37. The method of clause 35 or 36, wherein the further machine learning model determines a score based on one or more of: the number of emails sent by a particular device; the volume of recipients; the type of recipients; the proportion of blocked/undeliverable emails sent; devices connected to unique network endpoints; and predetermined text strings that are known to be suspicious.

38. The method of any preceding clause, further comprising storing historical network data, and receiving the historical network data at each of two or more machine learning models.

39. The method of any preceding clause, wherein determining a probability that a cybersecurity breach has occurred includes using a Bayes filter to identify normal behavior for the network structures, network devices and network users.

40. The method of any preceding clause, further comprising continually training an artificial intelligence classifier to identify cybersecurity breaches by forming a hypothesis relating to whether a cybersecurity breach has occurred and providing the output scores from each machine learning model to continually train the artificial intelligence classifier during its operational life or deployment when the hypothesis is resolved.

41. The method of any preceding clause, further comprising transmitting a report identifying one or more identified network devices that have been compromised by a cybersecurity breach, and causing an autonomous mitigation action directed to the one or more identified network devices that have been compromised by a cybersecurity breach when the score is above a threshold amount.

42. The method of any preceding clause, further comprising using one or more clustering methods to model the normal behavior of network structures, network devices and network users, the clustering methods including matrix based clustering, density based clustering and hierarchical clustering techniques.

43. A non-transitory computer-readable medium including executable instructions that, when executed with one or more processors, cause a cyber-threat defense system to perform the method of any preceding clause.

The invention claimed is:

1. A cyber threat defense system comprising:
a network module configured to ingest network data associated with network structures, network devices and network users;
an analyzer module configured to cooperate with one or more machine learning models and the network module, wherein a first machine learning model of the one or more machine learning models is configured to evaluate the network data, identify metrics associated with the network data and then cooperate with the network module to output a score indicative of whether anomalous network data metrics are caused by a cyber threat;
an artificial intelligence classifier configured to receive outputs of each of the one or more machine learning models, determine a probability that a cybersecurity breach has occurred, and transmit a message to an autonomous response module based on the determined probability of a cybersecurity breach; and
a natural language processing module configured to analyse the network data metrics, wherein the network data metrics are associated with at least file names and file extensions of at least one computer file that has left the network or has been altered.

2. The system of claim 1, further comprising:
a probability calculation module configured to calculate a probability distribution for the network data metrics, wherein the network data metrics are associated with a time and location of a network event, and wherein the first of the one or more machine learning models is configured to determine a score based on a comparison between the probability distribution and the network data metrics.

3. The system of claim 2, wherein the first machine learning model is configured to map the network data metrics and the probability distribution to a continuous shape and wherein the artificial intelligence classifier is configured to identify anomalous network data metrics based on a comparison between the probability distribution and the network data metrics.

4. The system of claim 1,
wherein a second machine learning model of the one or more machine learning models is configured to determine a score based on predetermined text strings identified in the file names or file extensions of the computer file.

5. The system of claim 1, wherein the network data metrics are further
associated with file extensions and mime types of computer files that have been altered, and wherein a third machine learning model of the one or more machine learning models is configured to determine a score based on predetermined text strings identified in the file extensions and mime types.

6. The system of claim 1, wherein the network data metrics are further
associated with network communication protocols, and wherein a fourth machine learning model of the one or more machine learning models is configured to determine a score based on predetermined text strings identified in the network communication protocols.

7. The system of claim 1, further comprising:
an email module configured to ingest email data and a natural language processing module, wherein the analyzer module is further configured to receive the email data, wherein a fifth of the one or more machine learning models is configured to identify metrics associated with unencrypted email protocols or unencrypted email header information, and wherein the fifth machine learning model is further configured to determine a score based on predetermined text strings identified in the unencrypted email protocols or unencrypted email header information, wherein the fifth machine learning model is further configured to utilize one or more unsupervised machine learning algorithms.

8. The system of claim 1, further comprising:
a data store configured to store historical network data, two or more machine learning models, and wherein each machine learning model is further configured to receive the historical network data.

9. The system of claim 1, wherein the analyzer module is further configured to form a hypothesis relating to whether a cybersecurity breach has occurred and provide outputs of the one or more machine learning models to the artificial intelligence classifier when the hypothesis is resolved to thereby continually train the artificial intelligence classifier during its operational life or deployment to identify cybersecurity breaches.

10. The system of claim 1, wherein the autonomous response module is configured to transmit a report identifying one or more identified network devices that have been compromised by a cybersecurity breach, and to cause an autonomous mitigation action directed to the one or more identified network devices that have been compromised by a cybersecurity breach when the score is above a threshold amount.

11. A cyber threat defense method comprising:
ingesting network data associated with network structures, network devices and network users;
evaluating the network data with a first of one or more machine learning models, identifying metrics associated with the network data, and outputting at least a first score indicative of whether anomalous network data metrics are caused by a cyber threat;
receiving output scores from each of the one or more machine learning models;
determining a probability that a cybersecurity breach has occurred; and
transmitting a message to an autonomous response module based on the determined probability of a cybersecurity breach,
wherein the evaluating of the network data with the first machine learning model of the one or more machine learning models comprises calculating a probability distribution for the network data metrics, wherein the network data metrics are associated with at least a time and location of a network event, and the score determined by the first machine learning model and output is based on a comparison between the probability distribution and the network data metrics.

12. The method of claim 1, wherein the first machine learning model maps the network data metrics and the probability distribution to a continuous shape and wherein the artificial intelligence classifier compares the network data metrics with the probability distribution to identify anomalous network data metrics.

13. The method of claim 11, further comprising:
evaluating of the network data utilizing a second machine learning model of the one or more machine learning models by at least (i) analyzing the network data metrics, wherein the network data metrics are associated with file names and file extensions of computer files that have left the network, and (ii) determining a second score with the second machine learning model based on predetermined text strings identified in the file names or extension or content of a computer file.

14. The method of claim 11, further comprising:
evaluating of the network data utilizing a third machine learning model of the one or more machine learning models by at least (i) analyzing the network data metrics, wherein the network data metrics are associated with file extensions and mime types of computer files that have been altered, and (ii) determining a third score with the third machine learning model based on predetermined text strings identified in the file extensions and mime types.

15. The method of claim 11, further comprising:
evaluating of the network data utilizing a fourth machine learning model of the one or more machine learning models by at least (i) analyzing the network data metrics, wherein the one or more network data metrics are associated with network communication protocols, and (ii) determining a fourth score with the fourth machine learning model based on predetermined text strings identified in the network communication protocols.

16. The method of claim 11, further comprising:
ingesting email data, receiving the email data at a fifth machine learning model, identifying metrics associated with unencrypted email protocols or unencrypted email header information, determining a score with the fifth machine learning model based on predetermined text strings identified in the unencrypted email protocols or unencrypted email header information, and utilizing one or more unsupervised machine learning algorithms.

17. The method of claim 11, further comprising:
storing historical network data, and receiving the historical network data at each of two or more machine learning models.

18. The method of claim 11, further comprising:
continually training an artificial intelligence classifier to identify cybersecurity breaches by forming a hypothesis relating to whether a cybersecurity breach has occurred and providing the output scores from each machine learning model to continually train the artificial intelligence classifier during its operational life or deployment when the hypothesis is resolved.

19. A non-transitory computer-readable medium including executable instructions that, when executed with one or more processors, cause a cyber-threat defense system to perform the method of claim 11.

* * * * *